(12) United States Patent
Arredondo et al.

(10) Patent No.: US 6,487,814 B1
(45) Date of Patent: Dec. 3, 2002

(54) FISHING ACCESSORIES STORAGE APPARATUS

(76) Inventors: Robert A. Arredondo, 7351 Norwalk Blvd. #A-1, Whittier, CA (US) 90606; Lorena Arredondo, 7351 Norwalk Blvd. #A-1, Whittier, CA (US) 90606

( * ) Notice: Subject to any disclaimer, the term of this patent is extended or adjusted under 35 U.S.C. 154(b) by 0 days.

(21) Appl. No.: 09/759,068

(22) Filed: Jan. 12, 2001

(51) Int. Cl.$^7$ ................................................ A01K 97/06
(52) U.S. Cl. ...................... 43/54.1; 43/21.2; 206/315.11
(58) Field of Search ................. 43/54.1, 21.2; 206/315.11, 579; 224/922; 211/70.8; 312/216, 107.5; 292/259 R (56) References Cited

U.S. PATENT DOCUMENTS

| | | | | |
|---|---|---|---|---|
| 2,395,589 A | * | 2/1946 | Silverman et al. ........... | 312/216 |
| 2,823,971 A | * | 2/1958 | Hoyt ........................... | 43/54.1 |
| 3,005,671 A | * | 10/1961 | Majeski ....................... | 43/54.1 |
| 3,330,608 A | * | 7/1967 | Druger, Jr. ............... | 206/315.11 |
| 3,399,939 A | * | 9/1968 | Anderson ............... | 206/315.11 |
| 3,856,373 A | * | 12/1974 | Tucich ......................... | 312/216 |
| 3,889,860 A | | 6/1975 | Lindsey | |
| 4,353,182 A | | 10/1982 | Junkas et al. | |
| 4,355,818 A | * | 10/1982 | Watts ....................... | 280/47.19 |
| 4,841,661 A | * | 6/1989 | Moore ........................ | 43/54.1 |
| 4,958,730 A | * | 9/1990 | Bunten .................. | 206/315.11 |
| D318,175 S | | 7/1991 | Venanzini | |
| 5,054,228 A | * | 10/1991 | Elkins ......................... | 43/21.2 |
| 5,079,863 A | * | 1/1992 | Gillespie .................... | 43/54.1 |
| 5,159,777 A | * | 11/1992 | Gonzalez ................. | 280/47.19 |
| 5,163,694 A | * | 11/1992 | Reichek ...................... | 43/54.1 |
| 5,203,815 A | * | 4/1993 | Miller ..................... | 280/47.19 |
| 5,303,500 A | * | 4/1994 | Luukonen ................... | 43/54.1 |
| 5,333,885 A | * | 8/1994 | Pullman ................. | 280/47.19 |
| 5,347,746 A | | 9/1994 | Letson | |
| 5,435,642 A | * | 7/1995 | Kennedy ................. | 312/235.2 |
| 5,471,779 A | * | 12/1995 | Downey ...................... | 43/54.1 |
| 5,611,561 A | * | 3/1997 | Dale, II .................... | 280/47.19 |
| 5,634,291 A | * | 6/1997 | Pham ............................ | 43/56 |
| 5,636,469 A | * | 6/1997 | Pizzolo et al. ............... | 43/54.1 |
| 5,692,335 A | * | 12/1997 | Magnuson .................. | 43/54.1 |
| 5,802,760 A | * | 9/1998 | Campbell .................... | 43/54.1 |
| 5,864,981 A | * | 2/1999 | Zeman ........................ | 43/54.1 |
| 5,941,015 A | * | 8/1999 | Jenkins ........................ | 43/21.2 |
| 5,988,473 A | * | 11/1999 | Hagan et al. ................. | 224/404 |
| 5,996,272 A | * | 12/1999 | Raff ............................ | 43/54.1 |
| 6,082,757 A | * | 7/2000 | Lin ........................... | 280/47.18 |
| 6,138,840 A | * | 10/2000 | Seip ........................... | 211/70.8 |
| 6,193,062 B1 | * | 2/2001 | Rysgaard et al. ............. | 43/54.1 |

FOREIGN PATENT DOCUMENTS

| | | | |
|---|---|---|---|
| DE | 3626574 B1 | * | 2/1988 |
| DE | 29615424 B1 | * | 11/1996 |
| DE | 29702185 B1 | * | 4/1997 |
| FR | 2569948 B1 | * | 3/1986 |
| FR | 2760324 B1 | * | 9/1998 |

* cited by examiner

Primary Examiner—Darren W. Ark (57) ABSTRACT

A fishing accessories storage apparatus for saving the user time and energy by keeping all the fishing accessories neatly together. The fishing accessories storage apparatus includes a support member having a base and a wall member with a first and second sides; and also includes a first cabinet member securely mounted to the first side and having a plurality of drawers therein; and further includes a second cabinet member being securely mounted to the second side and having a plurality of drawers therein; and also includes a plurality of fishing rod holders securely mounted to the first and second sides of the wall member; and further includes a storage cooler securely mounted upon the base and being securely fastened to the first side of the wall member; and also includes a first aid kit securely mounted upon the base and being securely fastened to the second side of the wall member; and further includes a fishing net support member securely attached to a side end of the wall member; and also includes a container holding member securely attached to the other side end of the wall member; and further includes a first and second strip of hook and loop fasteners for supporting hooks and lures.

19 Claims, 4 Drawing Sheets

FISHING ACCESSORIES STORAGE APPARATUS

BACKGROUND OF THE INVENTION

1. Field of the Invention

The present invention relates to a fisher-person's organizer and more particularly pertains to a new fishing accessories storage apparatus for saving the user time and energy by keeping all the fishing accessories neatly together.

2. Description of the Prior Art

The use of a fisher-person's organizer is known in the prior art. More specifically, a fisher-person's organizer heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,333,885; U.S. Pat. No. 3,889,860; U.S. Pat. No. 2,823,971; U.S. Pat. No. 5,347,746; U.S. Pat. No. Des. 318,175; and U.S. Pat. No. 4,353,182.

While these devices fulfill their respective, particular objectives and requirements, the aforementioned patents do not disclose a new fishing accessories storage apparatus. The inventive device includes a support member having a base and a wall member with a first and second sides; and also includes a first cabinet member securely mounted to the first side and having a plurality of drawers therein; and further includes a second cabinet member being securely mounted to the second side and having a plurality of drawers therein; and also includes a plurality of fishing rod holders securely mounted to the first and second sides of the wall member; and further includes a storage cooler securely mounted upon the base and being securely fastened to the first side of the wall member; and also includes a first aid kit securely mounted upon the base and being securely fastened to the second side of the wall member; and further includes a fishing net support member securely attached to a side end of the wall member; and also includes a container holding member securely attached to the other side end of the wall member; and further includes a first and second strip of hook and loop fasteners for supporting hooks and lures.

In these respects, the fishing accessories storage apparatus according to the present invention substantially departs from the conventional concepts and designs of the prior art, and in so doing provides an apparatus primarily developed for the purpose of saving the user time and energy by keeping all the fishing accessories neatly together.

SUMMARY OF THE INVENTION

In view of the foregoing disadvantages inherent in the known types of fisher-person's organizer now present in the prior art, the present invention provides a new fishing accessories storage apparatus construction wherein the same can be utilized for saving the user time and energy by keeping all the fishing accessories neatly together.

The general purpose of the present invention, which will be described subsequently in greater detail, is to provide a new fishing accessories storage apparatus which has many of the advantages of the fisher-person's organizer mentioned heretofore and many novel features that result in a new fishing accessories storage apparatus which is not anticipated, rendered obvious, suggested, or even implied by any of the prior art fisher-person's organizer, either alone or in any combination thereof.

To attain this, the present invention generally comprises a support member having a base and a wall member with a first and second sides; and also includes a first cabinet member securely mounted to the first side and having a plurality of drawers therein; and further includes a second cabinet member being securely mounted to the second side and having a plurality of drawers therein; and also includes a plurality of fishing rod holders securely mounted to the first and second sides of the wall member; and further includes a storage cooler securely mounted upon the base and being securely fastened to the first side of the wall member; and also includes a first aid kit securely mounted upon the base and being securely fastened to the second side of the wall member; and further includes a fishing net support member securely attached to a side end of the wall member; and also includes a container holding member securely attached to the other side end of the wall member; and further includes a first and second strip of hook and loop fasteners for supporting hooks and lures.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing accessories storage apparatus which has many of the advantages of the fisher-person's organizer mentioned heretofore and many novel features that result in a new fishing accessories storage apparatus which is not anticipated, rendered obvious, suggested, or even implied by any of the prior art fisher-person's organizer, either alone or in any combination thereof.

It is another object of the present invention to provide a new fishing accessories storage apparatus which may be easily and efficiently manufactured and marketed.

It is a further object of the present invention to provide a new fishing accessories storage apparatus which is of a durable and reliable construction.

An even further object of the present invention is to provide a new fishing accessories storage apparatus which is susceptible of a low cost of manufacture with regard to both materials and labor, and which accordingly is then susceptible of low prices of sale to the consuming public, thereby making such fishing accessories storage apparatus economically available to the buying public.

Still yet another object of the present invention is to provide a new fishing accessories storage apparatus which provides in the apparatuses and methods of the prior art some of the advantages thereof, while simultaneously overcoming some of the disadvantages normally associated therewith.

Still another object of the present invention is to provide a new fishing accessories storage apparatus for saving the user time and energy by keeping all the fishing accessories neatly together.

Yet another object of the present invention is to provide a new fishing accessories storage apparatus which includes a support member having a base and a wall member with a first and second sides; and also includes a first cabinet member securely mounted to the first side and having a plurality of drawers therein; and further includes a second cabinet member being securely mounted to the second side and having a plurality of drawers therein; and also includes a plurality of fishing rod holders securely mounted to the first and second sides of the wall member; and further includes a storage cooler securely mounted upon the base and being securely fastened to the first side of the wall member; and also includes a first aid kit securely mounted upon the base and being securely fastened to the second side of the wall member; and further includes a fishing net support member securely attached to a side end of the wall member; and also includes a container holding member securely attached to the other side end of the wall member; and further includes a first and second strip of hook and loop fasteners for supporting hooks and lures.

Still yet another object of the present invention is to provide a new fishing accessories storage apparatus that allows the user to neatly carry all one's fishing accessories together.

Even still another object of the present invention is to provide a new fishing accessories storage apparatus that reduces the possibility of the user losing or not finding certain selected fishing accessories.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 4 thereof, a new fishing accessories storage apparatus embodying the principles and concepts of the present invention and generally designated by the reference numeral 10 will be described.

As best illustrated in FIGS. 1 through 4, the fishing accessories storage apparatus 10 generally comprises a support member 11 including a base 12 and a wall member 13 securely and conventionally mounted upon the base 12 and being vertically disposed. The wall member 13 has a first side 17, second side 18, top end and side ends. As a first embodiment, the base 12 includes a pair of elongate members 14, 15 being spaced apart and being adapted to rest upon a surface, and also includes a cross member 16 which securely interconnects and extends between the elongate members 14, 15. The support member 11 further has a handle member 44 securely and conventionally attached upon the top end with the support member 11 being approximately 3 feet tall and approximately 2 feet wide.

Figure 1:
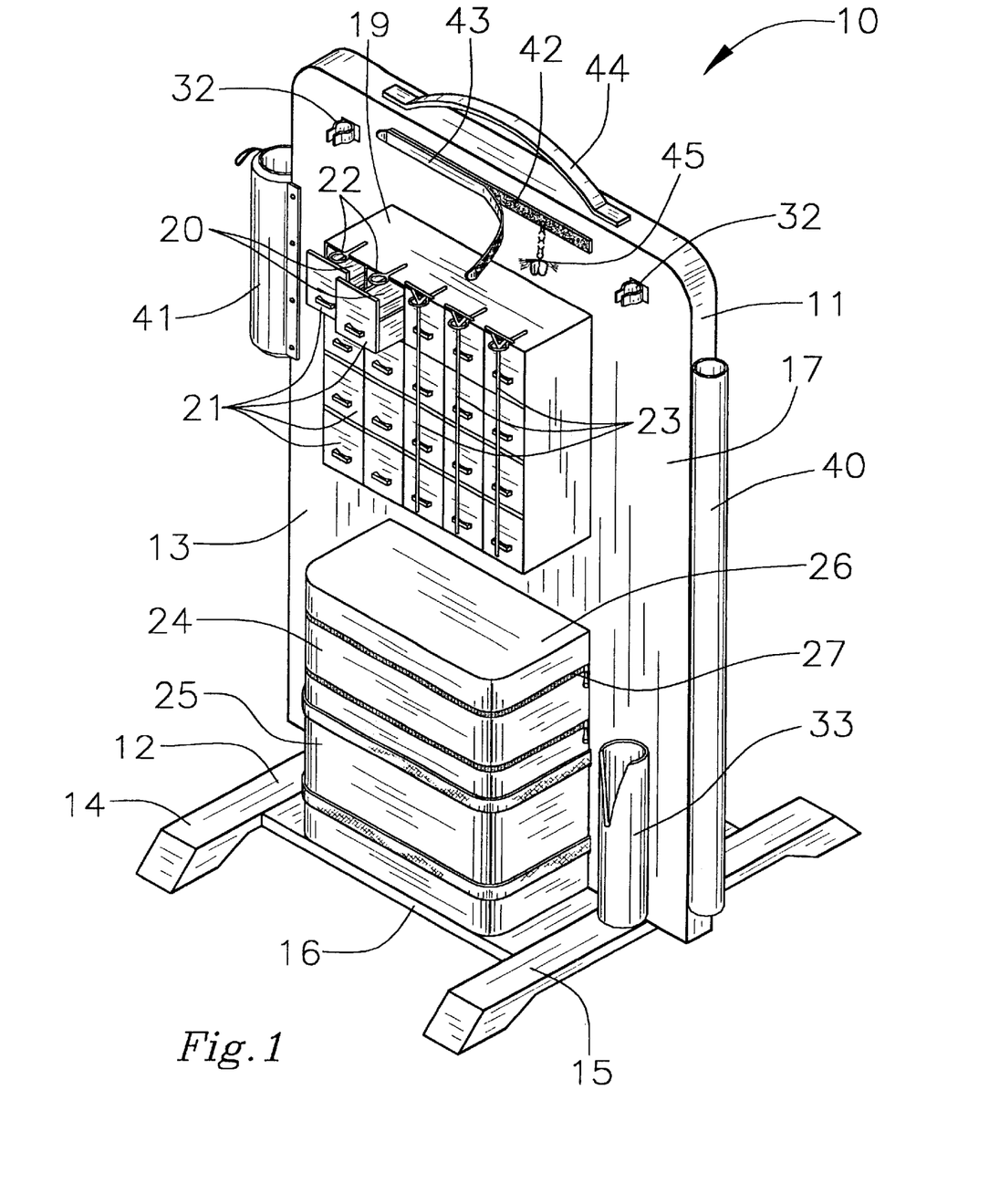
FIG. 1 is a perspective view of the first side of a new fishing accessories storage apparatus according to the present invention.

A first cabinet member 19 is securely and conventionally attached to the support member 11. As a first embodiment, the first cabinet member 19 is securely attached to the first side 17 of the wall member 13 near a top thereof and includes a plurality of compartments 20 and a plurality of drawers 21 each being movably disposed in a respective one of the compartments 20. Each of the drawers 21 is adapted to receive and store selected fishing accessories. The first cabinet member 19 also includes a means for securing the drawers 21 in the compartments 20 which includes a plurality of eyelets 22 securely attached to a top of the first cabinet member 19 and being spaced apart, and also includes a plurality of rods 23 each being removably disposed in a respective eyelet 22. The rods 23 are removably extended along a front of the drawers 21 to prevent the drawers 21 from coming out of the compartments 20.

A storage cooler 24 is securely and conventionally mounted upon the base 12 and, as a first embodiment, is securely attached to the first side 17 of the wall member 13 with straps. The storage cooler 24 includes a container member 25 having an insulated compartment and a cover member 26 removably disposed upon the container member 25 and a fastening member 27 for fastening the cover member 26 upon the container member 25.

Figure 2:
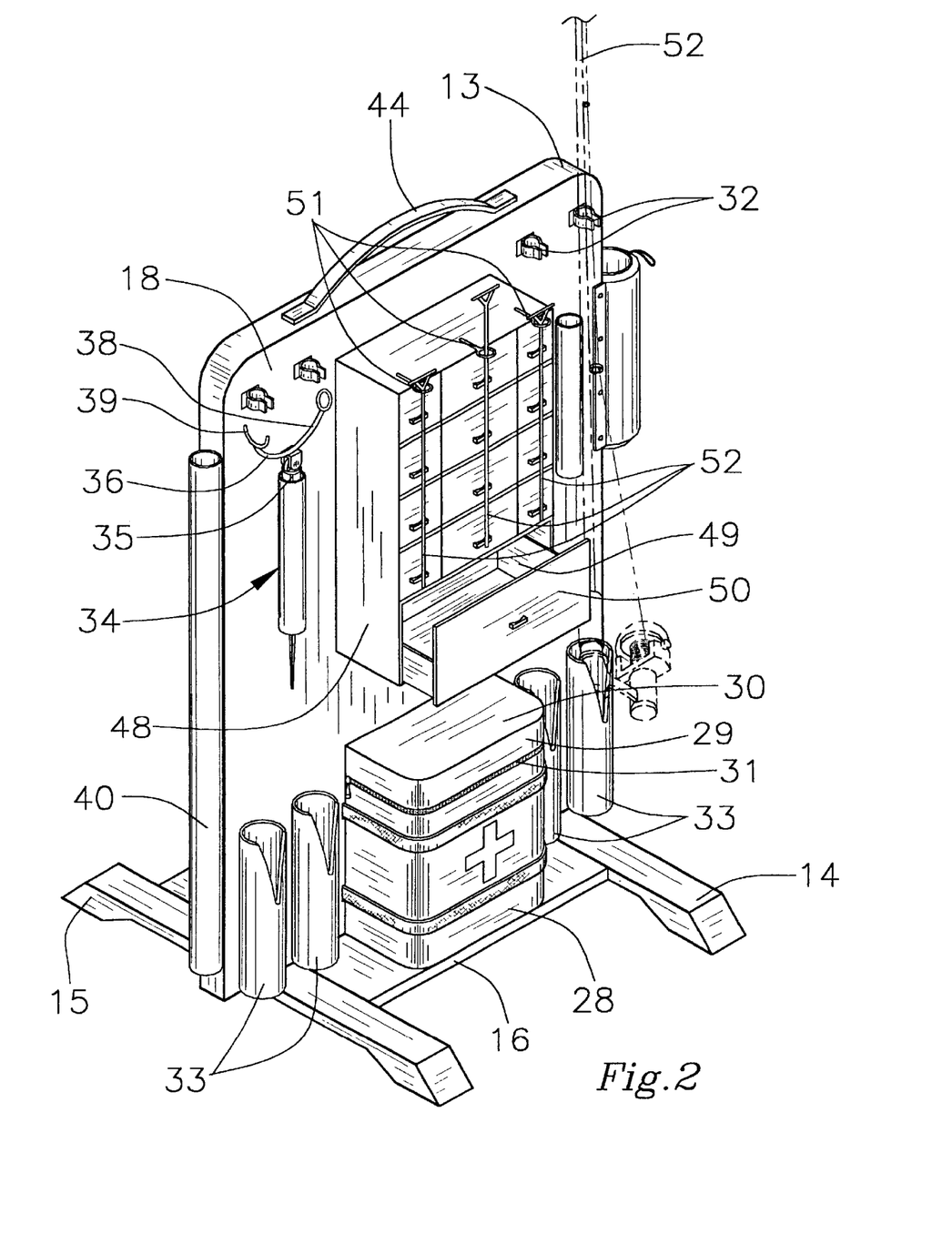
FIG. 2 is a perspective view of the second side of the present invention.
Figure 3:
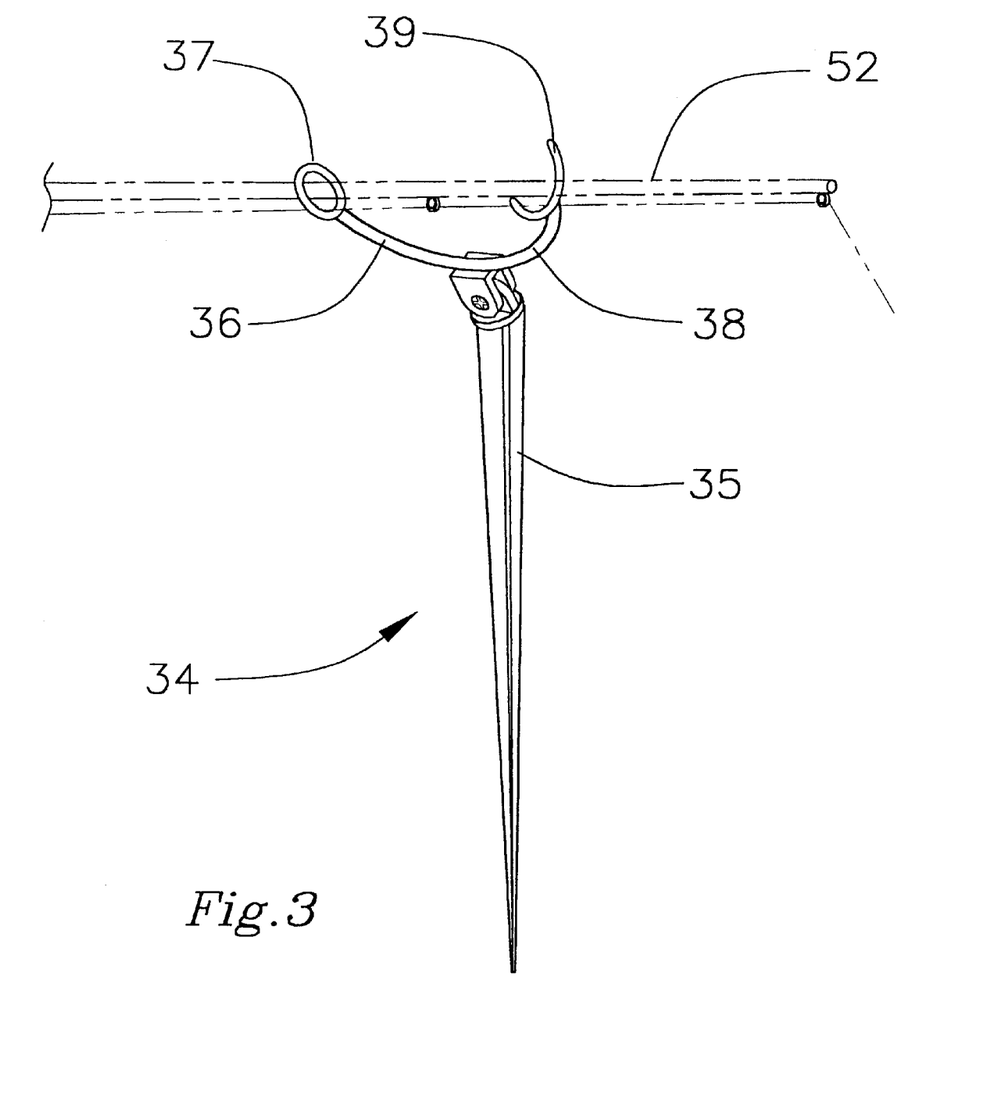
FIG. 3 is a perspective view of a mounting bracket for a fishing rod pole holder of the present invention.

A plurality of fishing rod holders include pole retaining members 32 securely and conventionally mounted, as a first embodiment, to the first and second sides 17, 18 and near the top of the wall member 13 and also include tubular members 33 securely and conventionally mounted upon the base 12 and to the first and second sides 17, 18 of the wall member 13. Each of the tubular members 33 is vertically aligned with a respective pole retaining member 32 and also has an open top. The retaining members 32 are bracket members each having mirrored lug members spaced apart and extending from the wall member 13 for receiving a portion of a fishing pole 52 therebetween. The fishing rod holders further include a mounting bracket 34 having an elongate main portion 35 securely and conventionally attached to the second side 18 of the wall member 13, and also include a pair of arm portions 36, 38 extending outwardly from the main portion 35 with one 36 of the arm portions having an end 37 terminating in a loop and with the other of the arm members 38 having a U-shaped end 39, both of the ends 37, 39 of the arm portions 36, 38 being adapted to support a fishing pole 52.

A second cabinet member 48, as a first embodiment, is securely attached to the second side 18 near the top of the wall member 13. The second cabinet member 48 includes a plurality of compartments 49, and includes a plurality of drawers 50 movably disposed in the compartments 49 and being adapted to hold and store selected fishing accessories, and also includes a means for securing the drawers 50 in the compartments 49 which includes a plurality of eyelets 51 securely attached to a top of the second cabinet member 48 and being spaced apart, and also includes a plurality of rods 52 each being removably disposed in a respective eyelet 51. The rods 52 are removably extended along a front of the drawers 50 to prevent the drawers 50 from coming out of the compartments 49.

A first aid kit 28 is securely and conventionally mounted upon the base 12 and, as a first embodiment, is securely attached to the second side 18 of the wall member 13 with straps. The first aid kit 28 includes a box-like container 29 having an open top, and also includes a lid 30 removably disposed on the box-like container 29, and further includes a fastener 31 for fastening the lid 30 upon the box-like container 29.

A fishing net support member 40 is securely and conventionally mounted to one of the side ends of the wall member 13 with the fishing net support member 40 including an elongate tubular member having open ends and a bore extending therethrough and being adapted to receive and support a fishing net.

As a first embodiment, a container holding member 41 is securely and conventionally attached to another of the side ends of the wall member 13 with the container holder member 41 including a tubular member having an open top and being adapted to receive and hold a water bottle.

A means for holding and storing fishing lures 45 and hooks includes a first strip 42 securely and conventionally attached to the first side 17 near the top end of the wall member 13, and also includes a second strip 43 removably attached to the first strip 42 to hold and retain hook and lures 45 therebetween. Each of the first 42 and second 43 strips has a side with hook and loop fasteners disposed thereon with the first strip 42 extending along a width of the wall member 13.

Figure 4:
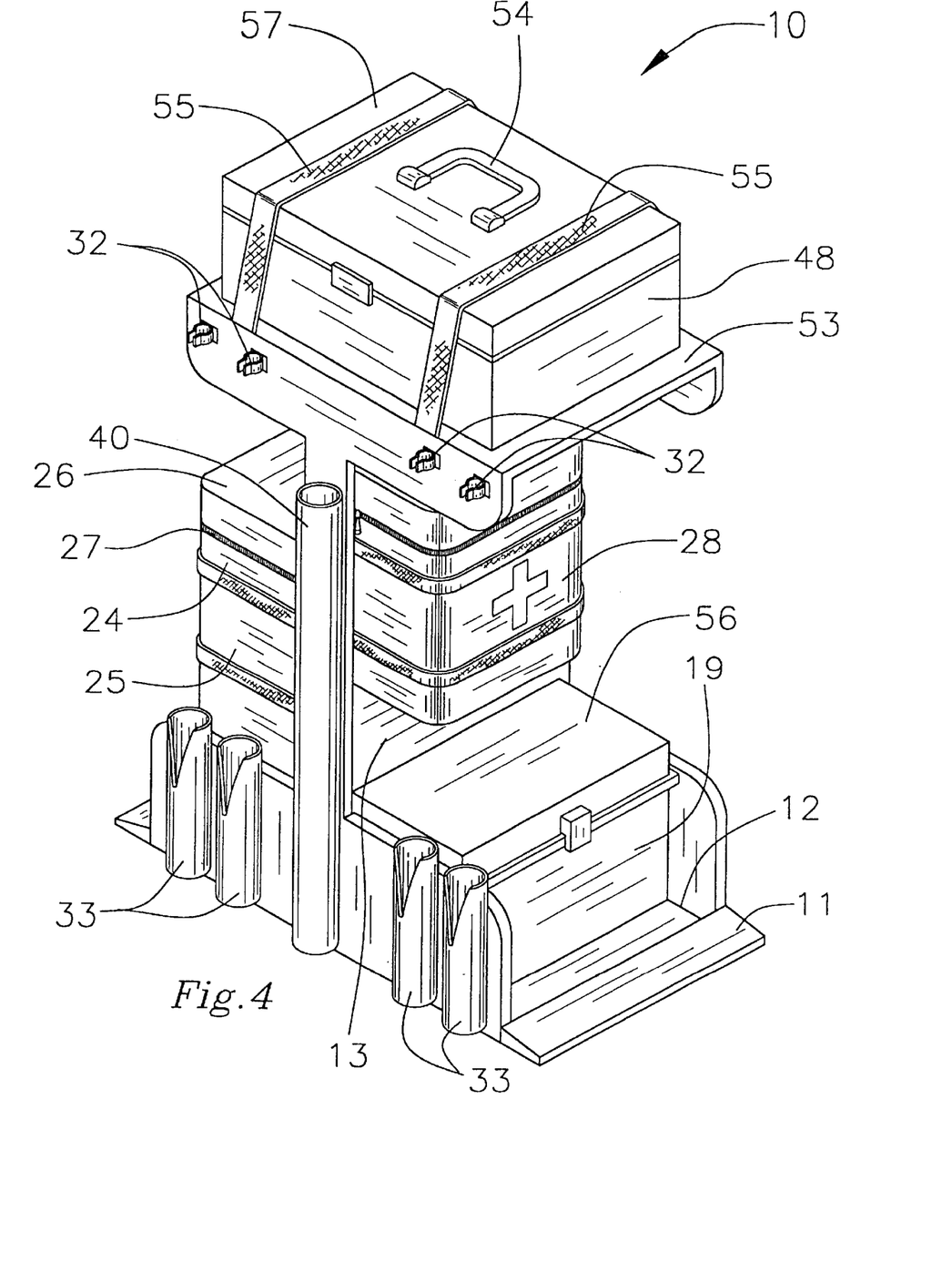
FIG. 4 is a perspective view of a second embodiment of the present invention.

As a second embodiment, the support member 11 also includes a shelf 53 being securely and conventionally mounted upon the top end of the wall member 17 and being horizontally disposed. The first cabinet member 19 includes a lid 56 for closing the first cabinet member 19. The pole retaining members 32 are securely and conventionally attached to a side of the shelf 53. The second cabinet member 48 is securely, removably and conventionally mounted upon the shelf 53 with straps 55 and has a lid 57 for closing the second cabinet member 48 and also has a handle member 54 being securely and conventionally attached to an exterior of the lid 57.

In use, the user can store one's fishing rods 52 and poles upon the support member 11 along with the fishing tackle which can be easily and conveniently placed in the first and second cabinet members 19, 48. In addition, the user can take along food and drink items which can be conveniently placed in the storage cooler 24 and can carry the fishing accessories storage apparatus 10 along in the car or on a boat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fishing accessories storage apparatus comprising:
a support member including a base and a wall member mounted upon said base and being vertically disposed, said wall member having a first side, second side, top end and side ends,
a first cabinet member attached to said support member;
a storage cooler mounted upon said base;
a plurality of fishing rod holders including pole retaining members mounted to said support member, and also including tubular members mounted upon said support member, each of said tubular members being vertically aligned with a respective one of said pole retaining members and also having an open top;
a second cabinet member attached to said support member;
a first aid kit mounted upon said base;
a fishing net support member mounted to one of said side ends of said wall member;
a container holding member being attached to the other of said side ends of said wall member;
said support member having a handle member attached upon said top end for the purpose of carrying said storage apparatus;
wherein said first cabinet member includes a plurality of compartments and a plurality of drawers each being movably disposed in a respective one of said compartments;
wherein said first cabinet member includes means for selectively securing said drawers in said compartments, said means for securing said drawers in said compartments of said first cabinet member including a plurality of eyelets attached to a top of said first cabinet member and being spaced apart, and also includes a plurality of rods each being removably disposed in a respective one of said eyelets, said rods being removably extendable along a front of said drawers to prevent said drawers from coming out of said compartments; and
a means for holding and storing fishing lures and hooks.

2. A fishing accessories storage apparatus as described in claim 1, wherein said base includes a pair of elongate members being spaced apart and being adapted to rest upon a surface, and also includes a cross member which interconnects and extends between said elongate members.

3. A fishing accessories storage apparatus as described in claim 1, wherein said storage cooler includes a container member having at least one insulated compartment and a cover member removably disposed upon said container member, and at least one fastening member for fastening said cover member upon said container member, said storage cooler being securely attached to said first side of said wall member.

4. A fishing accessories storage apparatus as described in claim 1, wherein said pole retaining members of said fishing rod holders are bracket members each having mirrored lug members spaced apart and extending from said wall member for receiving a portion of a fishing pole therebetween, and said tubular members of said fishing rod holders being mounted on said base and to said first and second sides of said wall member.

5. A fishing accessories storage apparatus as described in claim 1, wherein said plurality of fishing rod holders includes a fishing rod support member for supporting a fishing pole above ground, said fishing rod support member comprising a main portion and a pair of arm portions being pivotally coupled to said main portion, said main portion comprising a stake for inserting into the ground to securely hold said fishing rod support member in position;

each of said arm portions extending outwardly from said main portion with one of said arm portions having an end terminating in a loop and with the other of said arm members having a U-shaped end, both of said ends of said arm portions being adapted to support a portion of a fishing pole when said fishing rod support member is secured to the ground thereby permitting a user to fish hands-free, and said fishing rod support member being selectively storable in a mounting bracket, wherein said mounting bracket comprises a tube being mounted on said second side of said wall member and positioned adjacent to said top end.

6. A fishing accessories storage apparatus as described in claim 1, wherein said second cabinet member includes a plurality of compartments, and includes a plurality of drawers movably disposed in said compartments and being adapted to hold and store selected fishing accessories, and also includes a means for securing said drawers in said compartments, said second cabinet member being attached to said second side near said top end of said wall member; and wherein said means for securing said drawers in said compartments of said second cabinet member includes a plurality of eyelets securely attached to a top of said second cabinet member and being spaced apart, and also includes a plurality of rods each being removably disposed in a respective one of said eyelets, said rods being removably extended along a front of said drawers to prevent said drawers from coming out of said compartments.

7. A fishing accessories storage apparatus as described in claim 1, wherein said fishing net support member includes an elongate tubular member having open ends and a bore extending therethrough and being adapted to receive and support a fishing net;

wherein said container holding member includes a tubular member having an open top and being adapted to receive and hold a beverage container; and wherein said first aid kit includes a box-shaped container having an open top, and also includes a lid removably disposed on said box-shaped container, and further includes a fastener for fastening said lid upon said box-shaped container, said first aid kit being securely attached to said second side of said wall member.

8. A fishing accessories storage apparatus as described in claim 1, wherein said means for holding and storing lures and hooks includes a first strip securely attached to said first side near said top end of said wall member, a second strip being removably attachable to said first strip to retain hook and lures therebetween.

wherein each of said first and second strips has a side with hook and loop fasteners disposed thereon; and wherein said first strip extends along a width of said wall member.

9. A fishing accessories storage apparatus comprising:

a support member including a base and a wall member securely mounted upon said base and being vertically disposed, said wall member having a first side, second side, top end and side ends, a first cabinet member securely attached to said support member;

a storage cooler securely mounted upon said base;

a plurality of fishing rod holders including pole retaining members securely mounted to said support member, and also including tubular members securely mounted upon said support member, each of said tubular members being vertically aligned with a respective one of said pole retaining members and also having an open top;

a second cabinet member securely attached to said support member;

a first aid kit securely mounted upon said base;

a fishing net support member securely mounted to one of said side ends of said wall member;

a means for holding and storing fishing lures and hooks;

a container holding member being securely attached to the other of said side ends of said wall member;

wherein said base includes a pair of elongate members being spaced apart and being adapted to rest upon a surface, and also includes a cross member which interconnects and extends between said elongate members, said support member having a handle member securely attached upon said top end;

wherein said first cabinet member includes a plurality of compartments and a plurality of drawers each being movably disposed in a respective one of said compartments;

wherein said first cabinet member includes means for selectively securing-said drawers in said compartments, said means for securing said drawers in said compartments of said first cabinet member including a plurality of eyelets attached to a top of said first cabinet member and being spaced apart, and also includes a plurality of rods each being removably disposed in a respective one of said eyelets, said rods being removably extendable along a front of said drawers to prevent said drawers from coming out of said compartments.

10. A fishing accessories storage apparatus as described in claim 9, wherein said storage cooler includes a container member having at least one insulated compartment and a cover member removably disposed upon said container member, and at least one fastening member for fastening said cover member upon said container member, said storage cooler being securely attached to said first side of said wall member.

11. A fishing accessories storage apparatus as described in claim 9, wherein said pole retaining members of said fishing rod holders are bracket members each having mirrored lug members spaced apart and extending from said wall member for receiving a portion of a fishing pole therebetween; and said tubular members of said fishing rod holders being mounted on said base and to said first and second sides of said wall member.

12. A fishing accessories storage apparatus as described in claim 9, wherein said plurality of fishing rod holders includes a fishing rod support member for supporting a fishing pole above ground, said fishing rod support member comprising a main portion and a pair of arm portions being pivotally coupled to said main portion, said main portion comprising a stake for inserting into the ground to securely hold said fishing rod support member in position;

each of said arm portions extending outwardly from said main portion with one of said arm portions having an end terminating in a loop and with the other of said arm members having a U-shaped end, both of said ends of said arm portions being adapted to support a portion of a fishing pole when said fishing rod support member is secured to the ground thereby permitting a user to fish hands-free; and said fishing rod support member being selectively storable in a mounting bracket, wherein said mounting bracket comprises a tube being mounted on said second side of said wall member and positioned adjacent to said top end.

13. A fishing accessories storage apparatus as described in claim 9, wherein said second cabinet member includes a plurality of compartments, and includes a plurality of drawers movably disposed in said compartments and being adapted to hold and store selected fishing accessories, and also includes a means for securing said drawers in said compartments, said second cabinet member being attached to said second side near said top end of said wall member.

14. A fishing accessories storage apparatus as described in claim 13, wherein said means for securing said drawers in said compartments of said second cabinet member includes a plurality of eyelets securely attached to a top of said second cabinet member and being spaced apart, and also includes a plurality of rods each being removably disposed in a respective one of said eyelets, said rods being removably extended along a front of said drawers to prevent said drawers from coming out of said compartments.

15. A fishing accessories storage apparatus as described in claim 9, wherein said fishing net support member includes an elongate tubular member having open ends and a bore extending therethrough and being adapted to receive and support a fishing net;

wherein said container holding member includes a tubular member having an open top and being adapted to receive and hold a beverage container; and wherein said first aid kit includes a box-shaped container having an open top, and also includes a lid removably disposed on said box-shaped container, and further includes a fastener for fastening said lid upon said box-shaped container, said first aid kit being securely attached to said second side of said wall member.

16. A fishing accessories storage apparatus as described in claim 9, wherein said means for holding and storing lures and books includes a first strip securely attached to said first side near said top end of said wall member, a second strip being removably attachable to said first strip to retain hook and lures therebetween.

17. A fishing accessories storage apparatus as described in claim 16, wherein each of said first and second strips has a side with hook and loop fasteners disposed thereon.

18. A fishing accessories storage apparatus as described in claim 17, wherein said first strip extends along a width of said wall member.

19. A fishing accessories storage apparatus comprising:

a support member including a base and a wall member securely mounted upon said base and being vertically disposed, said wall member having a first side, second side, top end and side ends, said base including a pair of elongate members being spaced apart and being adapted to rest upon a surface, and also including a cross member which interconnects and extends between said elongate members, said support member further having a handle member securely attached upon said top end, said support member being approximately 3 feet tall and approximately 2 feet wide;

a first cabinet member securely attached to said first side of said wall member near a top thereof, said first cabinet member including a plurality of compartments and a plurality of drawers each being movably disposed in a respective one of said compartments, each of said drawers being adapted to receive and store selected fishing accessories, said first cabinet member also including means for securing said drawers in said compartments which includes a plurality of eyelets securely attached to a top of said first cabinet member and being spaced apart, and also includes a plurality of rods each being removably disposed in a respective one of said eyelets, said rods being removably extended along a front of said drawers to prevent said drawers from coming out of said compartments;

a storage cooler securely mounted upon said base and securely attached to said first side of said wall member, said storage cooler including a container member having at least one insulated compartment and a cover member removably disposed upon said container member, and at least one fastening member for fastening said cover member upon said container member;

a plurality of fishing rod holders including pole retaining members securely mounted to said first and second sides and near said top of said wall member. and also including tubular members securely mounted upon said base and to said first and second sides of said wall member, each of said tubular members being vertically aligned with a respective said pole retaining member and also having an open top, said pole retaining members being bracket members each having mirrored lug members spaced apart and extending from said wall member for receiving a portion of a fishing pole therebetween, said plurality of fishing rod holders including a fishing rod support member for supporting a fishing pole above ground, said fishing rod support member comprising a main portion and a pair of arm portions being pivotally coupled to said main portion, said main portion comprising a stake for inserting into the ground to securely hold said fishing rod support member in position, each of said arm portions extending outwardly from said main portion with one of said arm portions having an end terminating in a loop and with the other of said arm members having a U-shaped end, both of said ends of said arm portions being adapted to support a portion of a fishing pole when said fishing rod support member is secured to the ground thereby permitting a user to fish hands-free, said fishing rod support member being selectively storable in a mounting bracket, wherein said mounting bracket comprises a tube being mounted on said second side of said wall member and positioned adjacent to said top end;

a second cabinet member securely attached to said second side near said top end of said wall member, said second cabinet member including a plurality of compartments, and including a plurality of drawers movably disposed in said compartments and being adapted to hold and store selected fishing accessories, and also including a means for securing said drawers in said compartment which includes a plurality of eyelets securely attached to a top of said second cabinet member and being spaced apart, and also includes a plurality of rods each being removably disposed in a respective one of said eyelets, said rods being removably extended along a front of said drawers to prevent said drawers from coming out of said compartments;

a first aid kit securely mounted upon said base and being securely attached to said second side of said wall member, said first aid kit including a box-shaped container having an open top, and also including a lid removably disposed on said box-shaped container, and further including a fastener for fastening said lid upon said box-shaped container;

a fishing net support member securely mounted to one of said side ends of said wall member, said fishing net support member including an elongate tubular member having open ends and a bore extending therethrough and being adapted to receive and support a fishing net;

a container holding member securely attached to the other of said side ends of said wall member, said container holder member including a tubular member having an open top and being adapted to receive and hold a beverage container; and a means for holding and storing fishing lures and hooks including a first strip securely attached to said first side near said top end of said wall member, and also including a second strip removably attached to said first strip to hold and retain hook and lures therebetween, each of said first and second strips having a side with hook and loop fasteners disposed thereon, said first strip extending along a width of said wall member.

\* \* \* \* \*